United States Patent
Hudson

(10) Patent No.: US 9,802,689 B2
(45) Date of Patent: Oct. 31, 2017

(54) OIL COLLECTION SYSTEM

(71) Applicant: Richard Hudson, Metlaktia, AK (US)

(72) Inventor: Richard Hudson, Metlaktia, AK (US)

(*) Notice: Subject to any disclaimer, the term of this patent is extended or adjusted under 35 U.S.C. 154(b) by 122 days.

(21) Appl. No.: 14/859,483

(22) Filed: Sep. 21, 2015

(65) Prior Publication Data

US 2017/0081008 A1    Mar. 23, 2017

(51) Int. Cl.
| | |
|---|---|
| *B63H 21/38* | (2006.01) |
| *F01M 11/00* | (2006.01) |
| *F01M 11/04* | (2006.01) |
| *F01M 11/12* | (2006.01) |
| *F16N 31/00* | (2006.01) |

(52) U.S. Cl.
CPC ....... *B63H 21/386* (2013.01); *F01M 11/0004* (2013.01); *F01M 11/0408* (2013.01); *F01M 11/12* (2013.01); *F16N 31/006* (2013.01); *F01M 2011/0008* (2013.01); *F01M 2011/0029* (2013.01); *F01M 2011/0054* (2013.01)

(58) Field of Classification Search
CPC ............. B63H 21/386; F01M 11/0004; F01M 11/0408; F01M 11/12; F01M 2011/0008; F01M 2011/0029; F01M 2011/0054; F16N 31/00; F16N 31/002; F16N 31/004; F16N 31/006
USPC ......... 184/106; 180/69.1; 220/573; 222/108; 296/38; 141/86–88
See application file for complete search history.

(56) References Cited

U.S. PATENT DOCUMENTS

| | | | |
|---|---|---|---|
| 1,554,589 A * | 9/1925 | Long | F16N 31/002 184/1.5 |
| 2,577,188 A * | 12/1951 | Hall | F01M 5/002 184/104.2 |
| 2,732,024 A | 1/1956 | Schonwald | |
| 3,333,652 A | 8/1967 | Tribuzi | |
| 3,785,451 A | 1/1974 | McCord | |
| 4,875,537 A | 10/1989 | Garnatz et al. | |
| 4,909,355 A | 3/1990 | Ramos | |
| 4,936,418 A | 6/1990 | Clausen | |
| D363,944 S | 11/1995 | McCarter | |
| 5,526,900 A | 6/1996 | Mason | |
| 5,967,200 A * | 10/1999 | Hall | F16N 31/006 141/114 |
| 6,945,362 B1 | 9/2005 | Sumpter, Sr. | |
| 7,387,190 B2 * | 6/2008 | Lochocki, Jr. | F16H 57/0452 184/1.5 |
| 8,540,056 B2 | 9/2013 | Bentley | |
| 2006/0180398 A1* | 8/2006 | Khalil | B01D 35/0273 184/106 |

* cited by examiner

*Primary Examiner* — Ajay Vasudeva

(57) ABSTRACT

An oil collection system includes a boat that has an engine. A pan is removably coupled to the engine such that the pan may capture oil leaked from the engine. A plurality of clips is provided and each of the clips is coupled to the pan. Each of the clips engages the bottom end of the engine such that the pan is removably retained on the engine. A filter is positioned within the pan such that the filter filters the oil. A gauge is coupled to the pan such that the gauge may display an amount of oil contained within the pan. A drain is coupled to the pan such that the drain may selectively drain the oil from the pan.

6 Claims, 4 Drawing Sheets

OIL COLLECTION SYSTEM

BACKGROUND OF THE DISCLOSURE

Field of the Disclosure

The disclosure relates to collection devices and more particularly pertains to a new collection device for collecting oil that leaks from a boat engine.

SUMMARY OF THE DISCLOSURE

An embodiment of the disclosure meets the needs presented above by generally comprising a boat that has an engine. A pan is removably coupled to the engine such that the pan may capture oil leaked from the engine. A plurality of clips is provided and each of the clips is coupled to the pan. Each of the clips engages the bottom end of the engine such that the pan is removably retained on the engine. A filter is positioned within the pan such that the filter filters the oil. A gauge is coupled to the pan such that the gauge may display an amount of oil contained within the pan. A drain is coupled to the pan such that the drain may selectively drain the oil from the pan.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
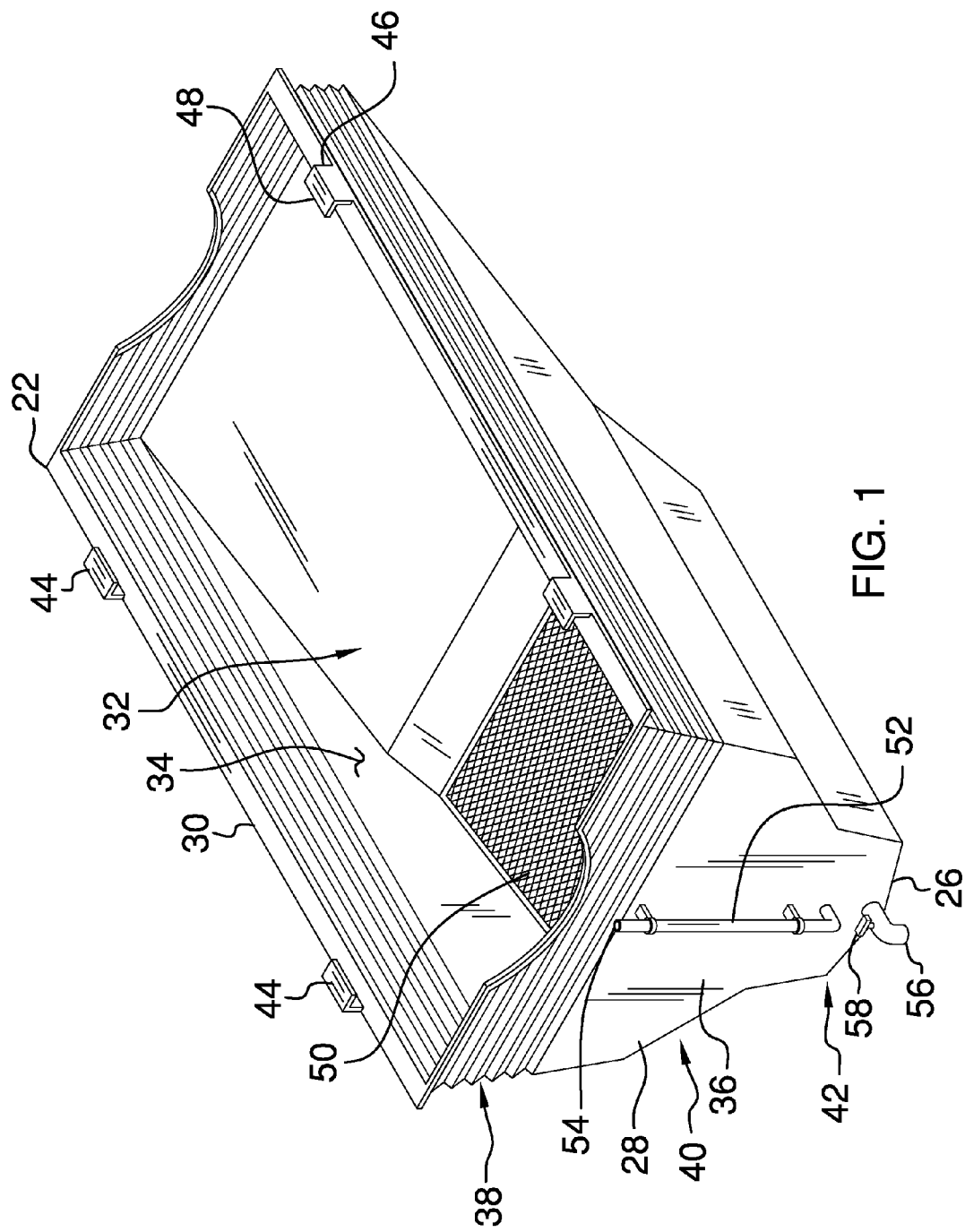
FIG. 1 is a top perspective view of an oil collection system according to an embodiment of the disclosure.
Figure 2:
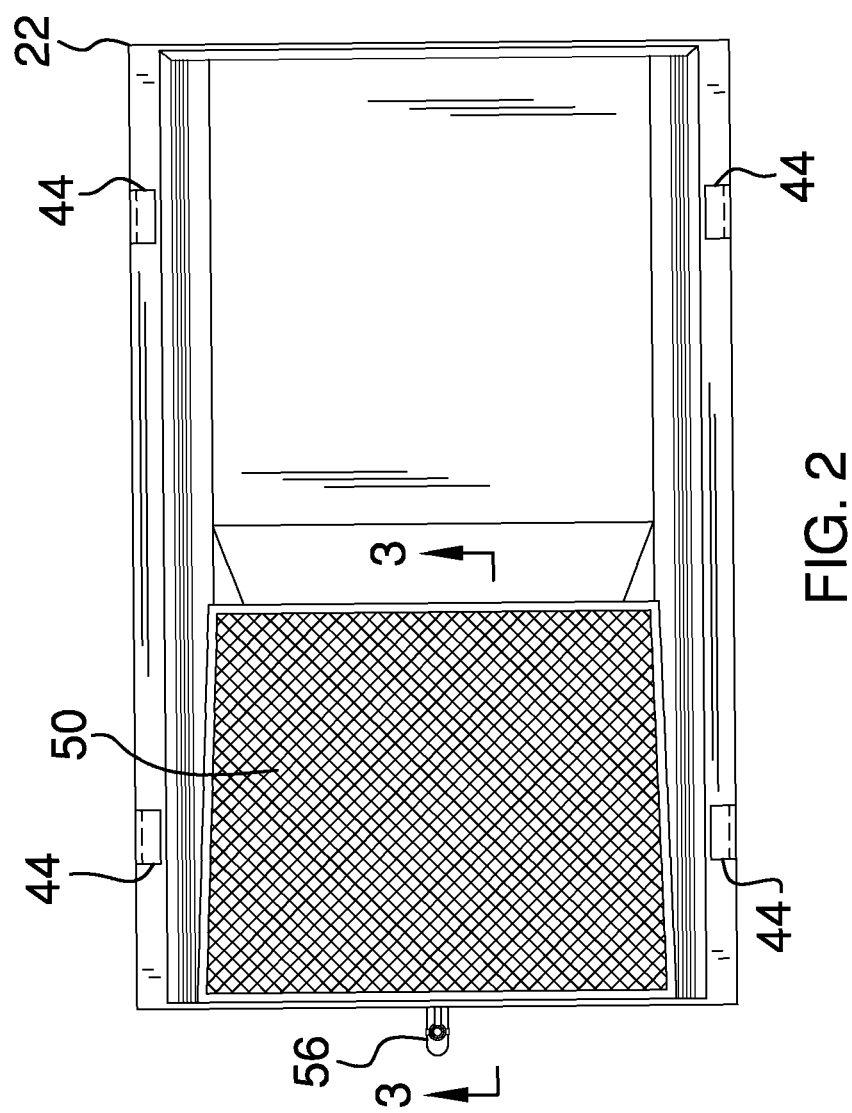
FIG. 2 is a top view of an embodiment of the disclosure.
Figure 4:
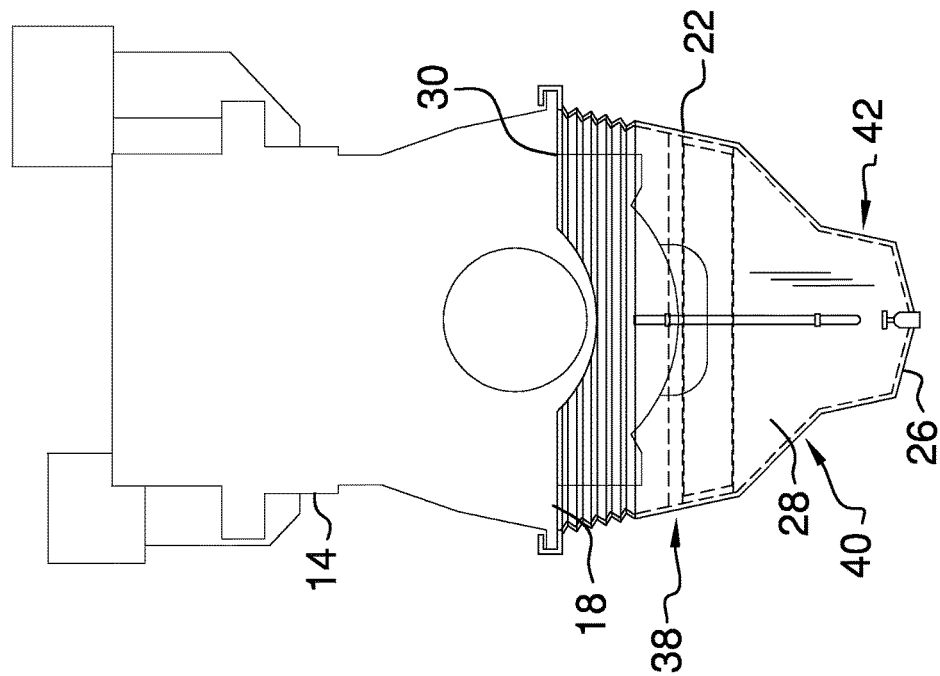
FIG. 4 is a front view of an embodiment of the disclosure.
Figure 3:
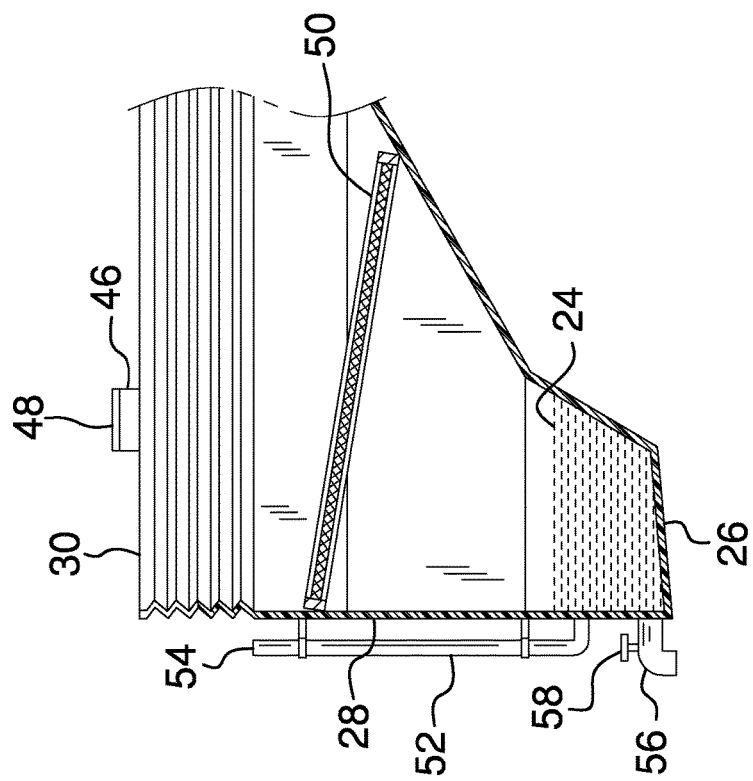
FIG. 3 is a cross sectional view taken along line 3-6 of FIG. 2 of an embodiment of the disclosure.
Figure 5:
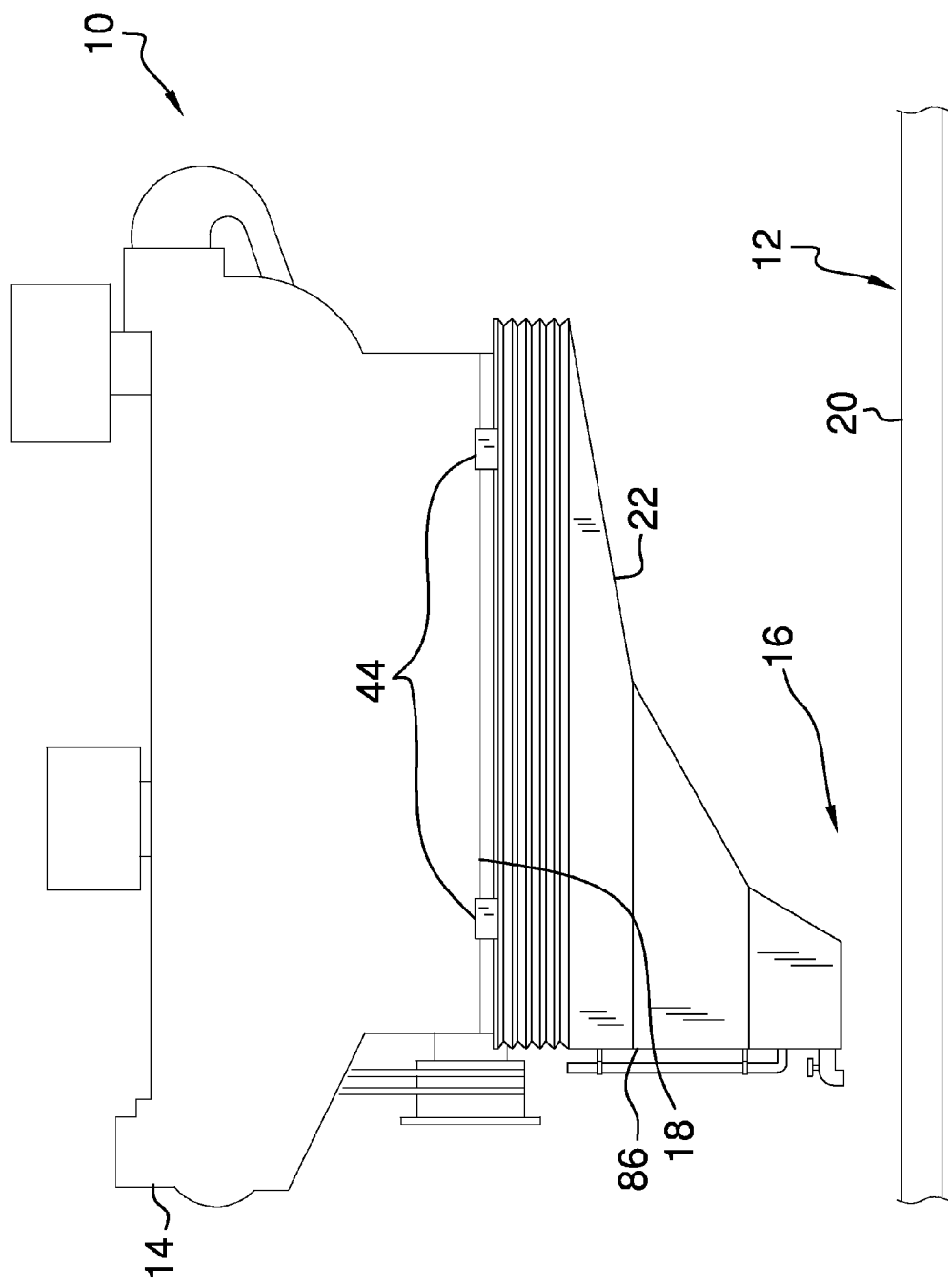
FIG. 5 is a left side view of an embodiment of the disclosure.

With reference now to the drawings, and in particular to FIGS. 1 through 5 thereof, a new collection device embodying the principles and concepts of an embodiment of the disclosure and generally designated by the reference numeral 10 will be described.

As best illustrated in FIGS. 1 through 5, the oil collection system 10 generally comprises a boat 12 that has an engine 14 and a bilge 16 and the engine 14 has a bottom end 18. The boat 12 may be a commercial fishing boat or the like and the engine 14 may be an internal combustion engine or the like. The boat 12 has a lowermost wall 20 and the engine 14 is spaced from the lowermost wall 20.

A pan 22 is removably coupled to the engine 14 such that the pan 22 may capture oil 24 leaked from the engine 14. The pan 22 has a bottom wall 26 and a peripheral wall 28 extending upwardly from the bottom wall 26. The peripheral wall 28 has a distal edge 30 with respect to the bottom wall 26 such that the distal edge 30 defines an opening 32 into the pan 22. The pan 22 is positioned having the distal edge 30 abutting the bottom end 18 of the engine 14 such that the opening 32 receives the oil 24.

The peripheral wall 28 has an inner surface 34, a front side 36, a top portion 38, a middle portion 40 and a bottom portion 42. The top portion 38 has a width and a length that is greater than a width and a length of the middle portion 40. The middle portion 40 has a width and a length that is greater than the bottom portion 42 such that the peripheral wall 28 directs the oil 24 into the bottom portion 42. The top portion 38 is substantially pleated such that the top portion 38 is flexible thereby facilitating the pan 22 to accommodate vibration from the engine 14.

A plurality of clips 44 is provided and each of the clips 44 comprises a leg 46 and a foot 48. The leg 46 of each of the clips 44 is attached to and extends upwardly from the distal edge 30 of the pan 22. The clips 44 are spaced apart from each other and are distributed around the distal edge 30. The foot 48 of each of the clips 44 engages the bottom end 18 of the engine 14 such that the pan 22 is removably retained on the engine 14.

A filter 50 is positioned within the pan 22 such that the filter 50 filters the oil 24. The filter 50 is positioned to coextensively abut the inner surface 34 corresponding to the top portion 38. The filter 50 may be a particulate oil filter or the like thereby facilitating the filter 50 to remove particles from the oil 24. Thus, the oil 24 may be salvaged from the pan 22 to be re-used in the engine 14.

A gauge 52 is coupled to the pan 22 such that the gauge 52 may display an amount of the oil 24 contained within the pan 22. The gauge 52 is attached to the front side 36 of the pan 22 and the gauge 52 has a distal end 54 with respect to the pan 22. The gauge 52 is in fluid communication with an interior of the pan 22 such that the gauge 52 displays a level of the oil 24 within the pan 22. The gauge 52 may be a manometer or the like.

A drain 56 is coupled to the pan 22 such that the drain 56 may selectively drain the oil 24 from the pan 22. The drain 56 is positioned on the front side 36 corresponding to the bottom portion 42 and the drain 56 is in fluid communication with the interior of the pan 22. The drain 56 includes a handle 58 and the handle 58 may be manipulated to selectively restrict or allow a flow of the oil 24 through the drain 56.

In use, the pan 22 is coupled to the bottom end 18 of the engine 14 such that the pan 22 is positioned between the engine 14 and the lowermost wall 20 of the boat 12. The pan 22 collects the oil 24 that leaks from the engine 14 thereby preventing the oil 24 from collecting in the bilge 16. The filter 50 filters the oil 24 thereby facilitating the oil 24 to be collected from the pan 22 and re-used in the engine 14. The filter 50 is removed and replaced when the filter 50 becomes dirty.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An oil collection system comprising:
a boat having an engine;
a pan being removably coupled to said engine wherein said pan is configured to capture oil leaked from said engine, said pan having a bottom wall and a peripheral wall extending upwardly from said bottom wall, said peripheral wall having a distal edge with respect to said bottom wall such that said distal edge defines an opening into said pan, said pan being positioned such that said distal edge abuts a bottom end of said engine wherein said opening is configured to receive the oil, said peripheral wall having an inner surface, a front side, a top portion, a middle portion and a bottom portion, said top portion having a width and a length being greater than a width and a length of said middle portion, said middle portion having a width and a length being greater than said bottom portion wherein said peripheral wall is configured to direct the oil into said bottom portion, said top portion being pleated such that said top portion is flexible thereby facilitating said pan to accommodate vibration from said engine;
a plurality of clips, each of said clips being coupled to said pan, each of said clips engaging said bottom end of said engine such that said pan is removably retained on said engine;
a filter being positioned within said pan wherein said filter is configured to filter the oil;
a gauge being coupled to said pan wherein said gauge is configured to display an amount of oil contained within said pan; and
a drain being coupled to said pan wherein said drain is configured to selectively drain the oil from said pan.
2. The system according to claim 1, wherein:
said pan has a distal edge; and
each of said clips comprises a leg and a foot, said leg of each of said clips being attached to and extending upwardly from said distal edge of said pan, said clips being spaced apart from each other and distributed around said distal edge.
3. The system according to claim 1, wherein:
said pan has an inner surface and a top portion; and
said filter is positioned to coextensively abut said inner surface corresponding to said top portion.

4. The system according to claim 1, wherein:
said pan has a front side; and
said gauge is attached to said front side of said pan, said gauge having a distal end with respect to said pan, said gauge being in fluid communication with an interior of said pan.
5. The system according to claim 1, wherein:
said pan has a front side and a bottom portion; and
said drain being positioned on said front side corresponding to said bottom portion, said drain being in fluid communication with said interior of said pan, said drain including a handle wherein said handle is configured to be manipulated to selectively restrict or allow a flow of the oil through said drain.
6. An oil collection system comprising:
a boat having an engine, said engine having a bottom end;
a pan being removably coupled to said engine wherein said pan is configured to capture oil leaked from said engine, said pan having a bottom wall and a peripheral wall extending upwardly from said bottom wall, said peripheral wall having a distal edge with respect to said bottom wall such that said distal edge defines an opening into said pan, said pan being positioned such that said distal edge abuts said bottom end of said engine wherein said opening is configured to receive the oil, said peripheral wall having an inner surface, a front side, a top portion, a middle portion and a bottom portion, said top portion having a width and a length being greater than a width and a length of said middle portion, said middle portion having a width and a length being greater than said bottom portion wherein said peripheral wall is configured to direct the oil into said bottom portion, said top portion being pleated such that said top portion is flexible thereby facilitating said pan to accommodate vibration from said engine;
a plurality of clips, each of said clips comprising a leg and a foot, said leg of each of said clips being attached to and extending upwardly from said distal edge of said pan, said clips being spaced apart from each other and distributed around said distal edge, said foot of each of said clips engaging said bottom end of said engine such that said pan is removably retained on said engine;
a filter being positioned within said pan wherein said filter is configured to filter the oil, said filter being positioned to coextensively abut said inner surface corresponding to said top portion;
a gauge being coupled to said pan wherein said gauge is configured to display an amount of oil contained within said pan, said gauge being attached to said front side of said pan, said gauge having a distal end with respect to said pan, said gauge being in fluid communication with an interior of said pan wherein said gauge is configured to display a level of the oil within said pan; and
a drain being coupled to said pan wherein said drain is configured to selectively drain the oil from said pan, said drain being positioned on said front side corresponding to said bottom portion, said drain being in fluid communication with said interior of said pan, said drain including a handle wherein said handle is configured to be manipulated to selectively restrict or allow a flow of the oil through said drain.

* * * * *